UNITED STATES PATENT OFFICE.

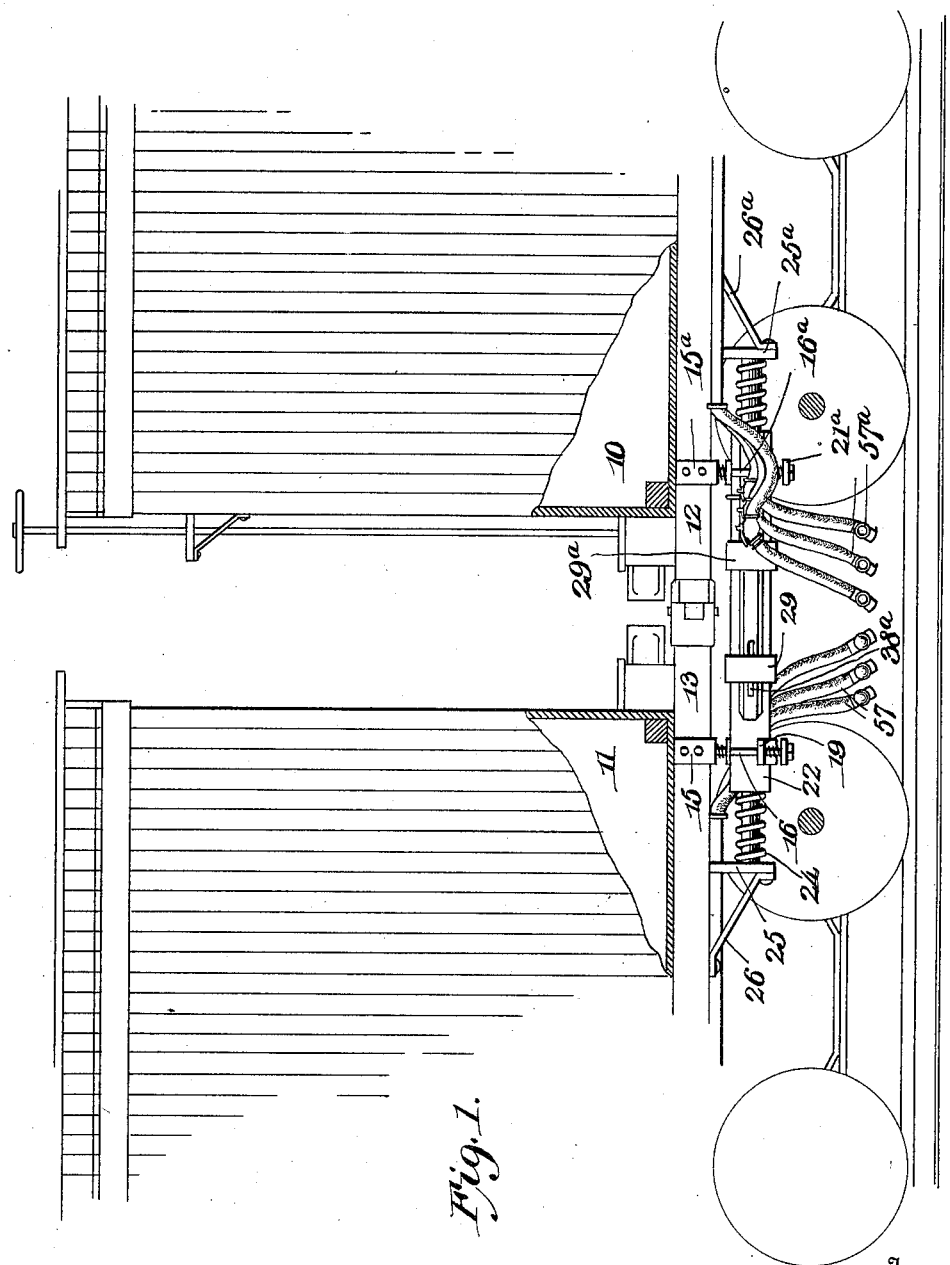

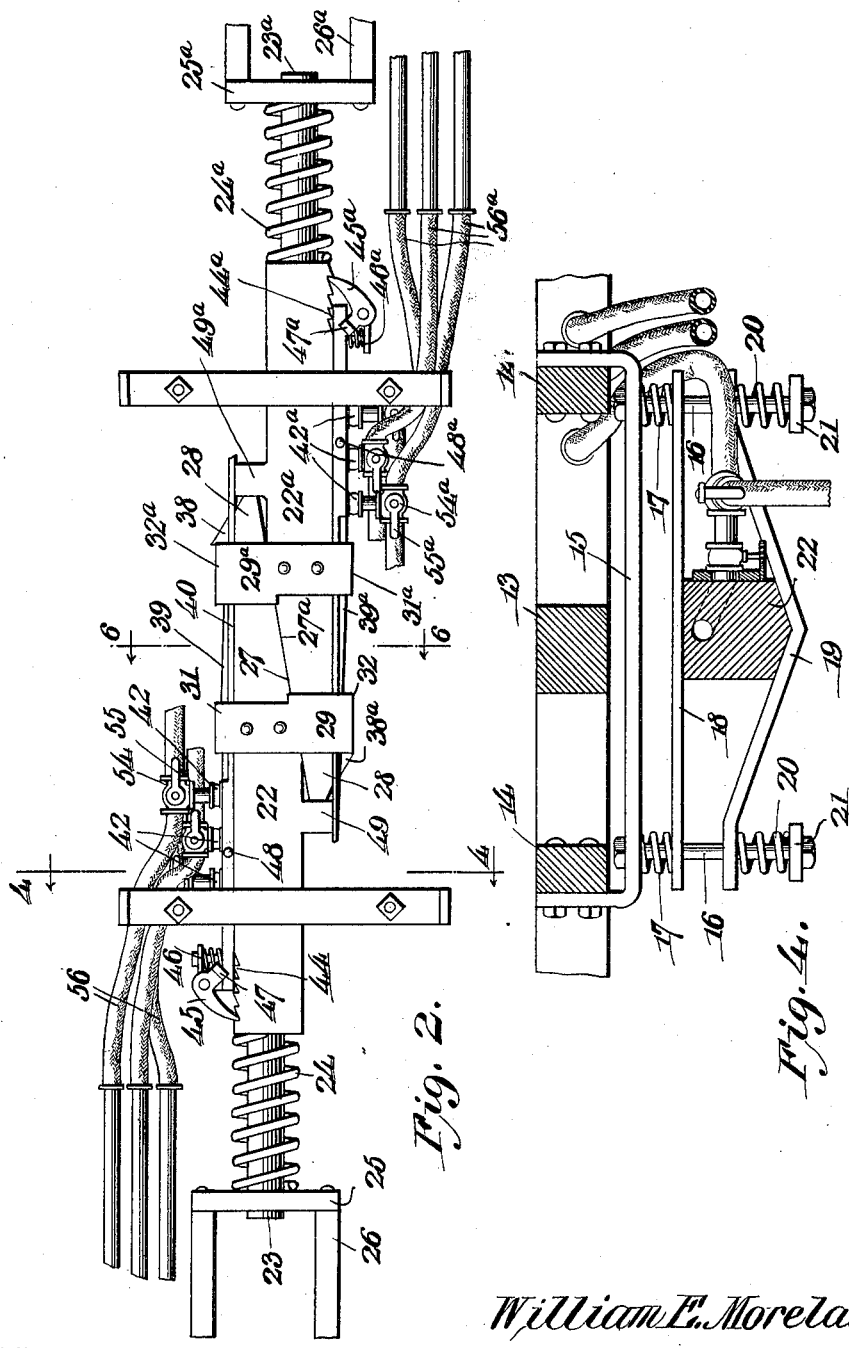

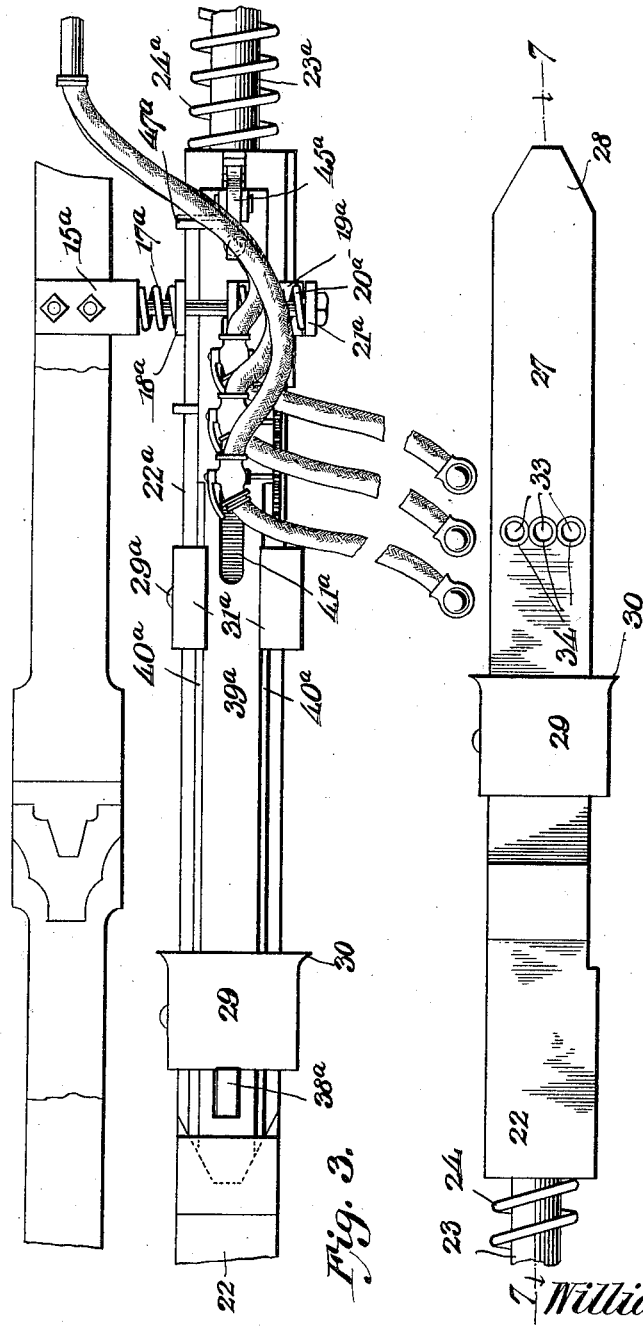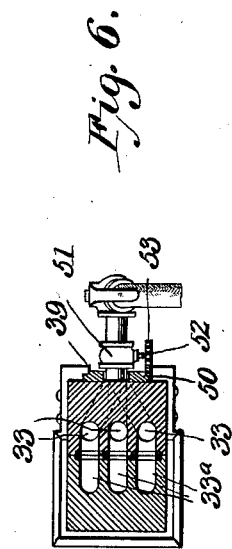

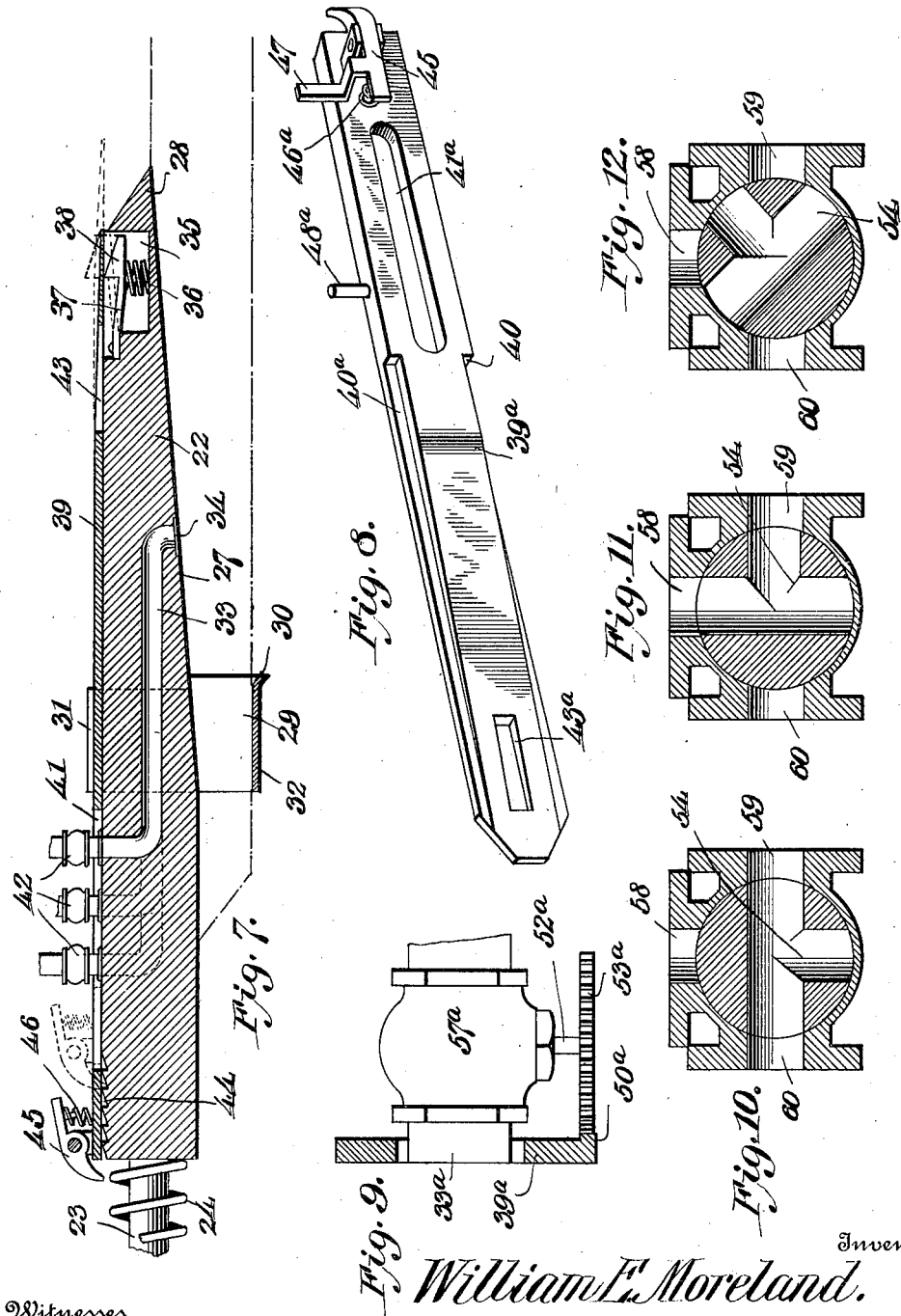

WILLIAM E. MORELAND, OF UNION CITY, GEORGIA.

PIPE-COUPLING.

1,029,453.

Specification of Letters Patent.   Patented June 11, 1912.

Application filed July 12, 1911. Serial No. 638,115.

*To all whom it may concern:*

Be it known that I, WILLIAM E. MORELAND, a citizen of the United States, residing at Union City, in the county of Campbell and State of Georgia, have invented new and useful Improvements in Pipe-Couplings, of which the following is a specification.

The invention relates to couplings, more particularly to couplings for use in connection with railway cars and the like and has for an object to provide a coupling for automatically connecting the service pipes of adjacent cars.

Among other features my invention embodies a coupling for connection with the under side of a car and adapted for engagement with a similar coupling similarly mounted on an adjacent car, means being provided to permit the coupling to adjust itself, relatively to the coupling on the adjacent car and to which the coupling is adapted to be connected, the service pipes on one coupling being adapted to register with the service pipes on the other coupling when the same are connected.

For the purpose mentioned, use is made of a main coupling bar and a sliding bar mounted to operate in conjunction with the main bar to releasably couple the service lines of one car to the service lines of an adjacent car, means being provided to lock the main bar on one car with the main bar of an adjacent car so that the said main bars will not be disengaged by the usual swinging motion of the cars as they operate over the rails, while at the same time any direct outward pull exerted upon one of the main bars will unlock the same from the other main bar, thus uncoupling the service lines of the said cars.

Reference is to be had to the accompanying drawings constituting a part of this specification, in which similar characters of reference denote corresponding parts in all the views, and in which—

Figure 1 is a fragmentary side elevation of adjacent connected cars and provided with my couplings, the same being in applied position. Fig. 2 is a plan view of a pair of my couplings in connected position. Fig. 3 is an enlarged side elevation of one of the couplings, showing the manner of mounting the same beneath the draw bar of a car, the other coupling being shown in fragmentary side elevation. Fig. 4 is a transverse sectional view taken substantially on the line 4—4 in Fig. 2. Fig. 5 is a side elevation of one of the coupling members shown in fragmentary detail in Fig. 3. Fig. 6 is a transverse sectional view taken on the line 6—6 in Fig. 2. Fig. 7 is a horizontal sectional view taken on the line 7—7 in Fig. 5, the dotted lines denoting a second position of the sliding bar. Fig. 8 is a perspective view of the sliding bar. Fig. 9 is a fragmentary side elevation of one of the valves for automatically opening or closing one of the service lines. Fig. 10 is a horizontal sectional view through one of the three-way valves showing the same in open position for connection with the usual service lines. Fig. 11 is a similar horizontal sectional view through the three-way valve showing the same in position for connection with the service line of my device. Fig. 12 is a similar horizontal sectional view of the three-way valve showing the same in neutral or closed position.

Referring to the views and more particularly to Figs. 1, 2 and 4 I provide adjacent cars 10, 11 connected by the usual coupling members 12, 13 and secured to beams 14 on the under side of the car 11 is a hanger 15, the coupling bar 13 being mounted between the beams 14 and having its outer end adapted to rest upon the hanger 15 when the cars are in uncoupled position. Mounted to depend from the hanger 15 are bolt rods 16 having expansible springs 17 mounted to encircle the same, with a plate 18 slidably mounted on the bolt rod 16 and arranged so that the springs 17 will be positioned between the hanger 15 and the plate 18. Mounted to slide on the lower ends of the bolt rods 16 is an angular stirrup 19 and mounted to encircle the lower ends of the rods 16 below the stirrup 19 are expansible springs 20, retained in engagement with the bolt rods by plates 21 so that the stirrup 19 will rest upon the springs 20 as shown in Fig. 4. The plate 18 is normally spaced from the stirrup 19 and loosely mounted to rest on the stirrup 19 is a main bar 22 provided at its rear end with a rod 23 having an expansible spring 24 mounted to encircle the same, the outer end of the rod 23 being slidably mounted in a bearing 25 rigidly secured by a strap 26 to the under side of the car, the inner end of the spring 24 being adapted to abut against the bearing 25 and the outer end of the said spring being adapted to abut against the rear end of the main bar 22.

The main bar 22 at its front end is provided with a tapered side 27 and terminates in a pointed end 28. Secured to the main bar 22 is a guide 29 having a flared end 30, the said guide being mounted to partially encircle the main bar 22 and provided with laterally extending flanges 31 projecting over one of the sides of the main bar 22 and being slightly spaced therefrom, a side 32 of the guide 29 being spaced a distance from the side 27 of the main bar 22 for a purpose that will be hereinafter more fully disclosed.

The main bar 22 has service pipes 33 extending into the same from the outer side thereof, the said service pipes being adapted to extend longitudinally in the main bar and then curved inwardly to terminate at the side 27, where suitable washers 34 are provided to encircle the inner ends of the service pipes, the said washers being mounted to fit flush with the tapered side 27 as shown in Fig. 7. Formed in the pointed end 28 of the main bar 22 is a recess 35 in which is mounted an expansible spring 36 having its outer end abutting against a dog 37 secured to the main bar 22, the said dog being provided with a tapered head 38 adapted to normally extend outwardly beyond the outer side of the bar 22.

Mounted to slide on the outer side of the main bar 22 is a slide bar 39 provided with grooves 40 in which the ends of the flanges 31 of the guide 29 are received, thus retaining the bar 39 in slidable engagement with the bar 22. The slide bar 39 is provided near its rear end with a slot 41 through which the service lines 42 are adapted to extend, the said service lines being connected to the pipes 33 and having connection with the car as will be hereinafter more fully disclosed. A slot 43 is provided in the slide bar 39 near the front end thereof, the said slot being spaced from the end of the bar 39 so that when my coupling is in applied position, the head 38 of the dog 37 will extend through the slot 43. The outer side of the main bar 22, near the rear end thereof, is provided with a series of notches 44 adapted to be engaged by a locking pawl 45 pivotally mounted on the rear end of the bar 39, the said locking pawl being engaged by a spring 46 adapted to normally retain the locking pawl in engagement with the notches 44 and the said locking pawl being provided with a finger 47. Extended upwardly from the upper side of the slide bar 39 is a pin 48 and by referring to Fig. 2, it will be seen that my device is arranged on a car so that the plate 18 will be positioned between the finger 47 of the locking pawl 45 and the pin 48 on the bar 39.

Referring to Figs. 1 and 2, it will be seen that the car 10 is provided with a coupling, the parts of which are similar to the parts of the device described heretofore and for the purpose of distinguishing between a certain part of the coupling of the car 11 and a similar part of the coupling on the car 10 I have designated the parts of the coupling on the car 10 with the same numerals as the parts of the coupling on the car 11, with the exception that I have added the letter "a" to each of the numerals designating the parts of the coupling on the car 10. Now when the coupling on the car 11 is engaged with the coupling on the car 10, the inclined side 27 of the main bar 22 will engage the inclined side $27^a$ of the main bar $22^a$ and the outer end of the main bar 22 will be received in the guide $29^a$ on the main bar $22,^a$ while the outer end of the main bar $22^a$ will be received in the guide 29 on the main bar 22 as will be readily understood. Formed on the main bar 22 is a stop flange 49, a similar stop flange $49^a$ being formed on the main bar $22^a$ and the mentioned stop flanges are so arranged that when the couplings of the respective cars 10 and 11 are connected, the pointed end $28^a$ of the main bar $22^a$ will abut against the stop flange 49 and the pointed end 28 of the main bar 22 will abut against the stop flange $49^a$ as shown in Fig. 2. When the pointed ends of the main bars engage the stop flanges as mentioned, the pipes 33 of the main bar 22 and the pipes $33^a$ of the main bar $22^a$ will register at the point where the washers 34 and $34^a$ are mounted to encircle the ends of the pipes 33 and $33^a$ as shown in Fig. 7. Now when the pointed ends of the main bars 22 and $22^a$ engage the respective stop flanges $49^a$ and 49, the main bars will be held in relatively rigid position and as the cars on which the couplings are mounted, are still moving toward each other, the springs 24 and $24^a$ will be compressed and the rods 23 and $23^a$ will slide rearwardly in the bearings 25, $25^a$. The plates 18 and $18^a$ being mounted on the under sides of the cars 10 and 11 and rigidly retained from moving longitudinally relatively to the cars will now be engaged by the pins 48, $48^a$ and as the mentioned pins engage the respective plates, the slide bars 39, $39^a$ will be slidably operated on the respective main bars 22, $22^a$, to uncover the dogs so that the heads 38, $38^a$ thereof will project through the slots 43, $43^a$ and engage the rear ends of the guides 29, $29^a$ as shown more particularly in Fig. 2, it being understood that when the slide bars 39, $39^a$ are in normal position, the dogs will be beneath the slide bars 39, $39^a$ and will not extend through the slots 43, $43^a$. Now as the slide bars 39, $39^a$ slide on the respective main bars 22, $22^a$, the locking pawls 45, $45^a$, actuated by the springs 46, $46^a$, to engage the notches 44, $44^a$, will move forwardly over the notches as shown in Figs. 2 and 7, the normal or inoperative position of one of the locking pawls 45 being shown in full lines in Fig. 7 and the locking position of the said pawl being shown in dotted lines in Fig. 7. Thus, it will be seen that the heads 38, 38ª of the dogs are now locked with the guides 29ª, 29 and the locking pawls 45, 45ª are in locking engagement with the main bars 22, 22ª so that the coupling on one of the cars will be retained in locking engagement with the coupling on the other car, the pipes 33 on the one coupling being in register with the pipes 33ª on the other coupling.

When the cars 10 and 11 are uncoupled by uncoupling the usual couplings 12 and 13, the action of the springs 24, 24ª in expanding will cause the fingers 47, 47ª of the locking pawls 45, 45ª to engage the plates 18, 18ª, thus disengaging the locking pawls 45, 45ª on the notches 44, 44ª and as the cars are being parted, the plates 18, 18ª moving against the fingers 47, 47ª will slide the slide bars 39, 39ª on the respective main bars 22, 22ª so that the heads 38, 38ª of the dogs 27, 27ª will be forced downwardly beneath the ends of the slide bars 39, 39ª, as shown in Fig. 7, thus disengaging the heads 38, 38ª of the dogs from the respective guides 29, 29ª. The couplings will now be in unlocked position and as the cars 10 and 11 move still farther apart, the main bar 22 will slide out of engagement with the main bar 22ª so that the couplings will be entirely separated.

Formed on the lower outer sides of the slide bars 39, 39ª are racks 50, 50ª and mounted on the service pipes 42, 42ª, are valves 51, 51ª provided with valve stems 52, 52ª to which are keyed toothed wheels 53, 53ª, in engagement with the respective racks 50, 50ª. Now when the couplings are in uncoupled position, the valves 51, 51ª will be in closed position and when the couplings are moved into coupling position, the slide bars 39, 39ª sliding on the respective main bars 22, 22ª will cause the toothed wheels 53, 53ª to operate over the racks 50, 50ª, thus opening the valves 51, 51ª. In the same manner when the couplings are uncoupled, the toothed wheels 53, 53ª will be rotated in the opposite direction to close the valves 51, 51ª.

Mounted at the outer ends of the service pipes 42, 42ª are valves 54, 54ª provided with suitable handles 55, 55ª and connected to the valves on one side thereof are the usual flexible service lines 56, 56ª having connection with the cars 11 and 10 and secured to the valves 54, 54ª are the usual flexible coupling members 57, 57ª, conveniently arranged as shown in Figs. 1 and 3. By providing the valves 54, 54ª, the cars 10 and 11 can be coupled together in the usual manner by means of the flexible coupling members 57, 57ª, and if it is desired to couple the cars 10 and 11 together with my improved device, as described heretofore, the flexible coupling members 57, 57ª, are simply permitted to remain in disengaged position and the service lines are coupled together by means of the service pipes in the main bars 22, 22ª.

The valves 54, 54ª are preferably three-way valves and when the handles 55, 55ª are operated to position the valves as shown in Fig. 10, the port 58, leading to the service pipes 33 or 33ª will be closed and the port 59 will be open to the port 60 which has connected thereto the usual flexible coupling members 57, 57ª, thus connecting the service lines on the cars 10 and 11 through the medium of the usual coupling members 57, 57ª, while the connection through the medium of the pipes 33, 33ª will be cut off. When the handles 55, 55ª are moved to the position shown in Fig. 11, the port 60 will be closed and the supply from the service lines 56, 56ª will pass through the port 59 and into the port 58 which is connected to the service pipes 42, 42ª, having connection with the pipes 33, 33ª. Now if the handles 55, 55ª are moved to a neutral position, each of the ports 58, 59 and 60 will be closed as shown in Fig. 12, thus preventing any connection between the service lines 56, 56ª on the respective cars 11 and 10.

From the foregoing description, it will be seen that I have provided a device in which the service lines of adjacent cars can be automatically connected when the cars are coupled together and in which the service lines can also be connected in the usual manner and without the use of my automatic coupling. Thus, it will be apparent that the air or steam passing through the service lines can be made to pass through the usual flexible coupling members or through my improved automatic coupling and although for the purpose of describing my coupling I have shown a particular construction thereof, it will be understood that I do not limit myself to the particular structure disclosed in the drawings and that the scope of the invention is defined in the appended claims.

Having thus fully described the invention, what I claim as new, is:—

1. In a device of the class described, a hanger block for engagement with the under side of a car, a main bar slidably mounted on the hanger block and adapted for engagement with the main bar of an adjacent car, a dog mounted on the main bar and adapted to engage the main bar of the adjacent car, a slide bar slidably mounted on the main bar for operating the said dog when the adjacent cars are coupled together and a locking pawl mounted on the slide bar and adapted to engage the main bar when the said slide bar is slidably operated on the main bar.

2. In a device of the class described, a hanger block for engagement with the under side of a car, a main bar slidably mounted on the hanger block and adapted for engagement with the main bar of an adjacent car, a spring actuated locking dog mounted on the main bar and adapted to engage the main bar of the adjacent car, a slotted slide bar slidably mounted on the main bar for operating the said dog when the adjacent cars are coupled together, the said dogs being adapted to extend through the slot in the slide bar and a spring actuated locking pawl mounted on the slide bar and adapted to engage the main bar when the said slide bar is slidably operated on the main bar.

3. In a device of the class described the combination of a hanger block for connection to the under side of a car, a main bar mounted to slide on the hanger block and adapted for engagement with the main bar of an adjacent car, a slide bar slidably mounted on the said main bar, means on the said slide bar and adapted to engage the said hanger block to automatically lock the main bars of adjacent cars when the said cars are coupled together, service pipes for connection with the main bar, valves mounted on the service pipes and a rack on the said slide bar and engaging the said valve for operating the same when the said slide bar is slidably operated on the said main bar.

4. In a device of the class described, the combination of a hanger block for connection to the under side of a car, a main bar mounted to slide on the hanger block and adapted for engagement with the main bar of an adjacent car, a slide bar slidably mounted on the main bar, pins mounted on the said slide bar and adapted to engage the said hanger block to automatically lock the main bars of adjacent cars when the said cars are coupled together, service pipes for connection with the said main bar, valves mounted on the said service pipes and a rack mounted on the said slide bar and engaging the said valve to operate the same when the said slide bar is slidably operated on the said main bar.

5. In a device of the class described, the combination of a hanger block for engagement with the under side of a car, a main bar slidably mounted on the hanger block and adapted for engagement with the main bar of an adjacent car, a slide bar mounted to slide on the said main bar, locking dogs mounted on the said main bar and adapted for engagement with the main bar of the adjacent car to lock the said main bars, means on the said slide bar for engagement with the said hanger block to actuate the said slide bar and operate the said locking dogs to automatically lock the said main bars when the adjacent cars are coupled together, service pipes for connection with the said main bar, valves mounted on the said service pipes and a rack mounted on the said slide bar and adapted to engage the said valves to operate the same when the said slide bar is slidably operated on the said main bar.

6. In a device of the class described, the combination of a main bar for slidable engagement with the hanger block of a car and adapted to engage the main bar of an adjacent car, a slide bar slidably mounted on the main bar, locking dogs mounted on the said main bar and adapted for engagement with the main bar of the adjacent car to lock the said main bars, service pipes for connection with the said main bar, valves mounted on the said service pipes and a rack mounted on the said slide bar and adapted for engagement with the said valves to operate the same when the said slide bar is slidably operated on the said main bar.

In testimony whereof I affix my signature in presence of two witnesses.

WILLIAM E. MORELAND.

Witnesses:
  Robt. F. Butler,
  W. C. Hopkins.

---

Copies of this patent may be obtained for five cents each, by addressing the "Commissioner of Patents, Washington, D. C."